(12) United States Patent
Challener et al.

(10) Patent No.: US 7,263,608 B2
(45) Date of Patent: Aug. 28, 2007

(54) SYSTEM AND METHOD FOR PROVIDING ENDORSEMENT CERTIFICATE

(75) Inventors: David Carroll Challener, Raleigh, NC (US); James Patrick Hoff, Raleigh, NC (US); Randall Scott Springfield, Chapel Hill, NC (US); James Peter Ward, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 645 days.

(21) Appl. No.: 10/735,388

(22) Filed: Dec. 12, 2003

(65) Prior Publication Data

US 2005/0132182 A1    Jun. 16, 2005

(51) Int. Cl.
*H04L 9/00* (2006.01)
(52) U.S. Cl. .................................... 713/156
(58) Field of Classification Search ............ 713/155, 713/156
See application file for complete search history.

(56) References Cited

U.S. PATENT DOCUMENTS

| | | | |
|---|---|---|---|
| 5,949,877 A | 9/1999 | Traw et al. ............... 380/4 |
| 6,108,788 A | 8/2000 | Moses et al. ............ 713/201 |
| 6,157,435 A | 12/2000 | Slater et al. ............. 355/40 |
| 6,223,291 B1 | 4/2001 | Puhl et al. .............. 713/201 |
| 6,915,430 B2* | 7/2005 | Wheeler et al. ......... 713/170 |
| 2003/0097569 A1* | 5/2003 | Wheeler et al. ......... 713/176 |
| 2005/0044906 A1* | 3/2005 | Spielman ................. 70/63 |
| 2005/0071687 A1* | 3/2005 | Pathakis et al. ......... 713/202 |

OTHER PUBLICATIONS

"Trusted Computing Platform Alliance", Published by Trusted Computing Group, Feb. 22, 2002, Version 1.1b, p. 1-322.*

* cited by examiner

Primary Examiner—Gilberto Barrón, Jr.
Assistant Examiner—Corbann Banks
(74) Attorney, Agent, or Firm—John L. Rogitz

(57) ABSTRACT

A Trusted Computing Platform Alliance (TCPA) endorsement certificate is provided by comparing a trusted platform module (TPM) public key transmitted by an owner of the computing device to which the TPM belongs to a copy of the key as originally stored in a remote database prior to vending the device. If a match is found the certificate is created using the public key, and then sent to the owner of the computing device.

17 Claims, 2 Drawing Sheets

SYSTEM AND METHOD FOR PROVIDING ENDORSEMENT CERTIFICATE

FIELD OF THE INVENTION

The present invention relates generally to secure computing devices.

BACKGROUND

Trust has become an important issue for e-commerce and other applications, particularly for mobile computing devices such as notebook computers. Specifically, as the mobility of the computing platform increases, it becomes susceptible to theft, with stolen data often representing a bigger loss than the hardware itself, because the data can include, e.g., user identity information, credit card information, and so on.

With this in mind, the Trusted Computing Platform Alliance (TCPA) has been formed to develop a specification for a trusted computing platform. Using a hardware security module (actually, a microcontroller) known as the Trusted Platform Module (TPM) that is soldered to the motherboard of the computing platform, the TCPA establishes what can be thought of as a platform root of trust that uniquely identifies a particular platform and that provides various cryptographic capabilities including hardware-protected storage, digital certificates, IKE (Internet Key Exchange), PKI (Public Key Infrastructure), and so on. Essentially, to overcome the vulnerability of storing encryption keys, authentication certificates, and the like on a hard disk drive, which might be removed or otherwise accessed or tampered with by unauthorized people, encryption keys, certificates, and other sensitive data is stored on the secure TPM.

The various keys including the endorsement keys are unique to the TPM. The endorsement keys are either generated at manufacturing time outside the TPM and then sent ("squirted") to the TPM for storage, or the keys are generated within the TPM itself. The keys can be used to in turn encrypt other keys for various purposes, thereby extending the trust boundary as desired.

The validity of the endorsement keys is attested to by an electronic document known as an endorsement certificate that is provided by someone other than the entity that provides the keys and that is generated using the TPM public half of the endorsement key. In other words, to ensure the validity of the TPM, the user of the TPM/host device may require an endorsement certificate, a process the details of which are currently undefined. As recognized herein, the provision of the endorsement certificate must be accomplished in a way that complicates hacking or that otherwise complicates compromising the process of certifying the validity of the TPM (and, hence, that complicates unauthorized attempts to defeat the security provided by the TPM).

SUMMARY OF THE INVENTION

A method for providing an endorsement certificate to a customer computing device includes providing an endorsement key pair to a security module (such as a trusted platform module) associated with the customer device. The endorsement key pair includes a public key and a private key. The method further includes storing data representative of the public key in a storage external to the customer device, and at a subsequent time, receiving at a comparison agent accessing the storage, certificate request data from the customer device. The comparison agent may or may not be associated with the storage agent. The certificate request data includes the public key and/or a hash of the public key with a temporary secret. It is then determined whether at least a portion of the certificate request data transmitted to the comparison agent matches the data representative of the public key stored in the storage. If so, the method includes generating the endorsement certificate using the public key and providing the endorsement certificate to the customer device. If desired, the method can also include signing the endorsement certificate with a signing key.

In another aspect, a customer device includes a security module containing a private key and a public key related to the private key, with the keys establishing an endorsement key pair. A processor accesses the security module and executes logic that includes requesting an endorsement certificate by sending data representative of the public key to a source of endorsement certificates. If it is determined at the source that the data representative of the public key matches a version of the data representative of the public key already stored at the source, the logic executed by the processor includes receiving from the source the endorsement certificate, which is generated at least in part by the public key.

In still another aspect, a computing facility includes means for storing data representative of public keys associated with respective customer computing devices, prior to providing the devices to customers. The facility also includes means for receiving transmissions of data representative of public keys from devices provided to customers, and means for comparing data representative of a public key from a device provided to a customer with at least data representative of a public key in the means for storing to determine if a match is found. Means are provided for generating an endorsement certificate if a match is found.

In another aspect, a service includes storing data representative of public keys associated with respective customer computing devices, and receiving transmissions of data representative of public keys from customer computing devices. The service also includes comparing the received data representative of a public key with at least the stored data representative of a public key to determine if a match is found, and, if a match is found, generating an endorsement certificate that is provided to the customer computing device.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
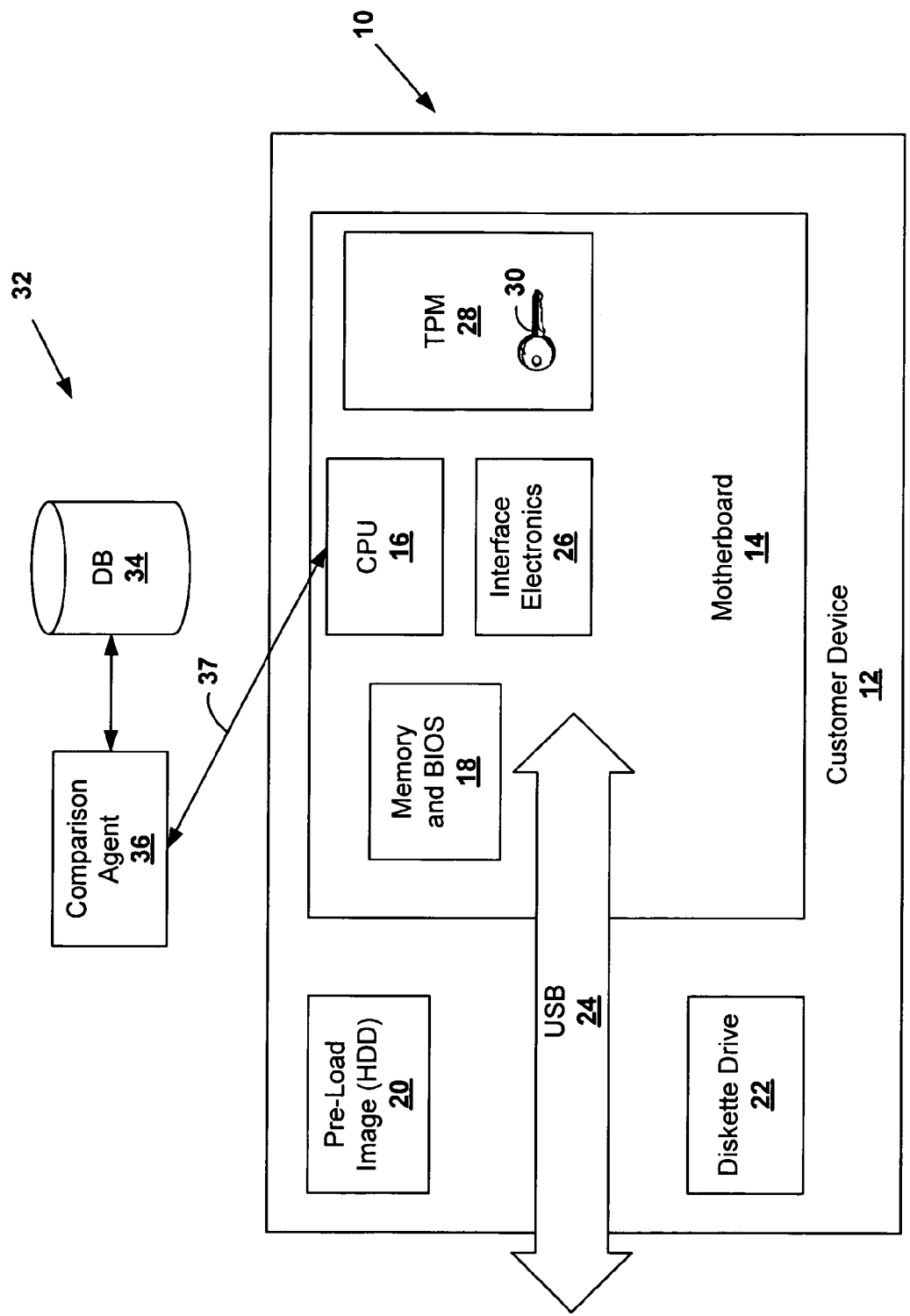
FIG. 1 is a block diagram of the present architecture.

Referring initially to FIG. 1, a computing system is shown, generally designated 10, that includes a customer computing device or platform 12. The customer device 12 can be any suitable computer, e.g., a personal computer or larger, a laptop computer, a notebook computer or smaller, etc.

As shown in FIG. 1, the preferred non-limiting customer device 12 includes a motherboard 14 on which is mounted at least one main central processing unit (CPU) 16 that can communicate with a solid state memory 18 on the motherboard 14. The memory 18 can contain basic input/output system (BIOS) instructions useful for booting the device 12 at start up. Additionally, other storage can be provided external to the motherboard 14, e.g., a hard disk drive 20 (that can hold a pre-load image of the software state of the device 12 upon completion of start up) and a floppy diskette drive 22. Moreover, the CPU 16 can communicate with external devices through a universal serial bus (USB) 24 using interface electronics 26 in accordance with USB principles known in the art.

As intended by the present invention, the customer device 12 can be rendered into a trusted device by the user. To this end, a security module such as a trusted platform module (TPM) 28 is provided on the motherboard 14. The presently preferred non-limiting TPM 28 is a hardware module that is soldered or otherwise affixed to the motherboard 14. Among other things, the TPM 28 contains various encryption keys 30, including storage keys, endorsement keys, and so on.

In accordance with the present invention, FIG. 1 shows that a vendor or other facility 32 can communicate with the customer device 12 for purposes to be shortly disclosed. The facility 32 includes a key comparison database or file system 34 that is accessed by a preferably software-implemented comparison agent 36 that communicates, via a wired or wireless link 37, with the customer device 12. The comparison agent 36 may be part of a Web interface, so that the logic below may be conducted over the Internet.

Figure 2:
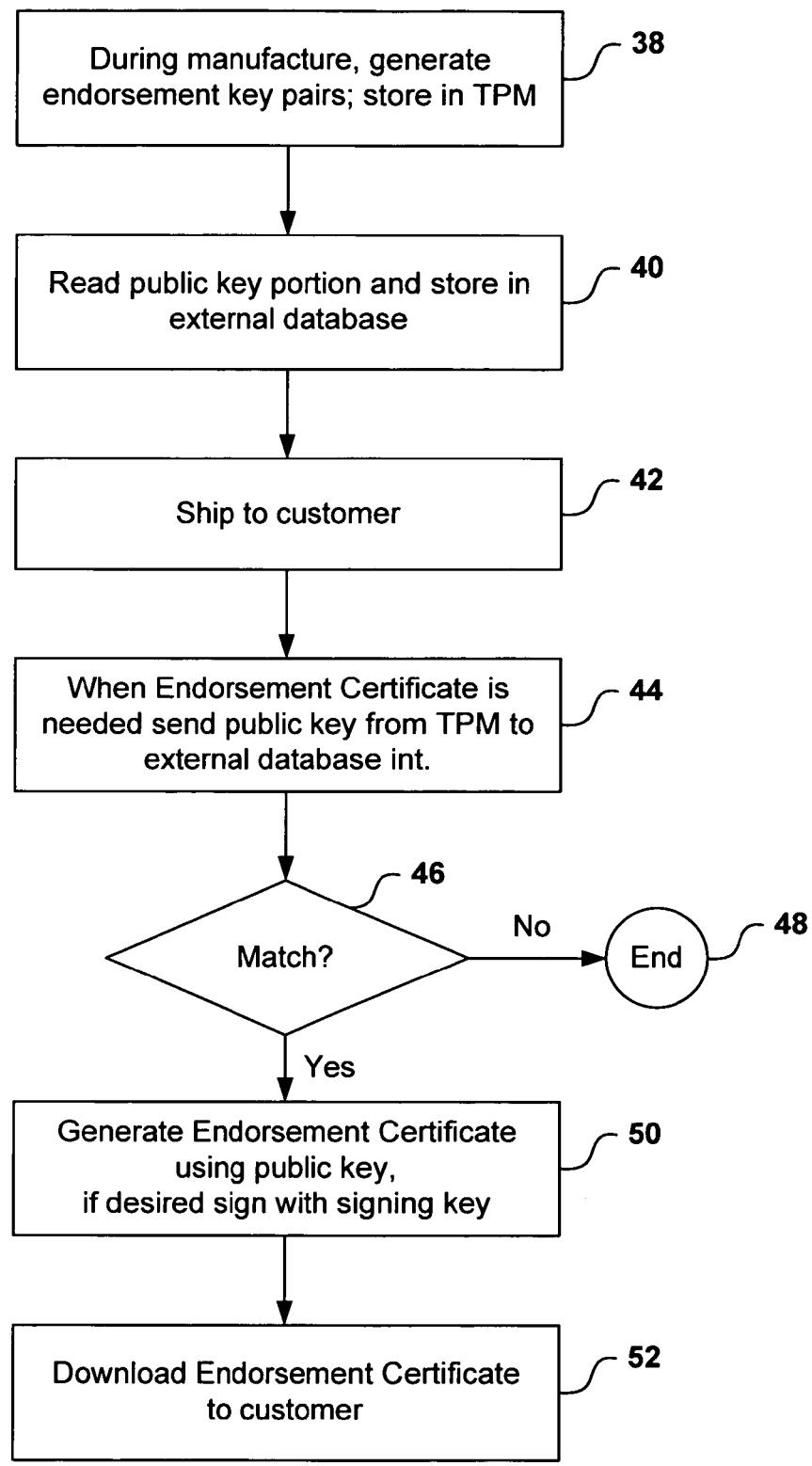
FIG. 2 is a flow chart of the presently preferred logic.

FIG. 2 shows the logic of the present invention. Commencing at block 38, during manufacture of the TPM 28 an endorsement key pair (consisting of a private key and a public key) is provided to the TPM 28. The key pair may be generated outside the TPM and then "squirted" to the TPM at the time of manufacture, or the TPM itself may generate the key pair. In any case, the key pair may be generated using, e.g., a random number using public key/private key generation principles known in the art. The private key is never sent outside the TPM 28, but at block 40 the public key portion is read and stored in the database 34. Once a copy of the public key is stored in the database 34, the customer device 12 with TPM 28 may be shipped, vended, or otherwise provided to the customer at block 42.

Block 44 indicates that when the customer requires an endorsement certificate, the customer causes the device 12 to send the public key portion of the endorsement key of the TPM 28 to the comparison agent 36. As recognized by the present invention, particularly when the endorsement key pair initially is generated outside the TPM and then squirted to it, it is desirable that a temporary secret such as a nonce (e.g., a random number of around twenty bytes) also be provided in the TPM 28 and also to the comparison agent 36. In such a case, not only is the public key sent to the comparison agent 36 at block 44, but also a version of the public key as modified by the temporary secret, e.g., a SHA-1hash of the public key and nonce. Once the request for a certificate has been sent along with the nonce/key hash, the TPM 28 destroys the nonce by, e.g., erasing it, so that the nonce cannot subsequently be discovered by de-layering the TPM 28.

At decision diamond 46 the agent determines whether the key received from the customer at block 44 matches the copy that was stored in the database 34 at block 40. When a version of the public key as hashed by the nonce is sent, the comparison agent 36 may compare a hash of the nonce and the public key in its database with the hash of the nonce and key received from the TPM 28. This comparison can be made by scanning the entire list of keys in the database 34, or by originally storing keys by TPM ID and then entering the database with the ID if provided at block 44, or by other means. In any case, if no match is found the process ends at state 48, but if a match is found, an endorsement certificate is generated at block 50 using the public key, preferably in accordance with TCPA certificate principles known in the art. If desired the certificate with key may be signed using a signing key. The certificate is then downloaded or otherwise provided to the customer at block 52.

All or portions of the above logic may be provided by a service that can be billed on an event by event basis (when a certificate is generated, e.g.) or, as another example, on a subscription basis. For instance, a service provider may access the storage, even if the storage is not maintained by the service provider, to provide certificates as set forth above.

While the particular SYSTEM AND METHOD FOR PROVIDING ENDORSEMENT CERTIFICATE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method comprising the acts of:
   providing an endorsement key pair to a security module associated with a customer computing device, the endorsement key pair including a public key and a private key;
   storing data representative of the public key in a storage external to the customer device;
   at a subsequent time, receiving at a comparison agent operatively connected to the storage, certificate request data from the customer device, die certificate request data including a hash of the public key with a temporary secret;
   determining whether at least a portion of the certificate request data transmitted to the comparison agent matches the data representative of the public key stored in the storage, and if so:
   generating an endorsement certificate at least in part using the public key;
   providing the endorsement certificate to the customer device; and
   erasing the temporary secret from the security module after the certificate request data has been sent to the comparison agent so that the temporary secret cannot subsequently be discovered.

2. The method of claim 1, wherein the receiving act is associated with a request from the customer device for the endorsement certificate.

3. The method of claim 1, further comprising transferring the customer device to a customer after the storing act.

4. The method of claim 1, wherein the security module is a trusted platform module (TPM).

5. The method of claim 1, wherein the storage and the comparison agent are not associated with a vendor of the customer device.

6. The method of claim 1, further comprising signing the endorsement certificate with a signing key.

7. A customer computing device, comprising:
at least one security module containing a private key and a public key related to the private key, the keys establishing an endorsement key pair;
at least one processor operatively connected to the security module and executing logic comprising:
requesting an endorsement certificate at least in part by sending data representative of the public key to a source of endorsement certificates, the data representative of the public key including a hash of the public key with a nonce; and
if it is determined at the source that the data representative of the public key matches a version of the data representative of the public key already at the source, receiving from the source an endorsement certificate generated by the source, the endorsement certificate being generated at least in part using the public key;
wherein the nonce is erased from the security module after the data representative of the public key has been sent to the source so that the nonce cannot subsequently be discovered.

8. The device of claim 7, wherein the endorsement certificate is signed with a signing key.

9. The device of claim 7, wherein the security module is a trusted platform module (TPM).

10. The device of claim 8, wherein the source of endorsement certificates is not the source of the customer device.

11. A service comprising:
storing data representative of public keys associated with respective customer computing devices;
receiving transmissions of data representative of public keys from customer computing devices;
comparing the received data representative of a public key with at least the stored data representative of a public key to determine if a match is found; and, if a match is found:
generating an endorsement certificate if a match is found; and
providing the endorsement certificate to the customer computing device, wherein the data representative of a public key includes a hash of the public key and a secret, the secret being erased from the customer computing device after the data representative of the public key has been sent to the facility such that the secret cannot be rediscovered.

12. The service of claim 11, wherein the endorsement certificate is generated based at least in part on the associated public key.

13. The service of claim 12, further comprising signing the endorsement certificate with a signing key before providing the endorsement certificate to the customer computing device.

14. The service of claim 11, wherein the public keys are associated with respective trusted platform modules.

15. A computing facility comprising:
means for storing data representative of public keys associated with respective customer computing devices, prior to providing the devices to customers;
means for receiving transmissions of data representative of public keys from devices provided to customers;
means for comparing data representative of a public key received from a device provided to a customer with at least data representative of a public key in the means for storing to determine if a match is found;
means for generating an endorsement certificate based at least in part on the associated public key if a match is found; and
means for transmitting the endorsement certificate to the customer device, wherein the data representative of a public key includes a hash of the public key and secret, and the secret is erased from a customer computing device after the data representative of the public key has been sent to the facility so that the secret cannot be rediscovered.

16. The facility of claim 15, wherein the means for generating signs the endorsement certificate with a signing key before transmitting the endorsement certificate to the customer device.

17. The facility of claim 15, wherein the public keys are associated with respective crusted platform modules.

* * * * *